(12) United States Patent
Fiete et al.

(10) Patent No.: US 6,880,943 B2
(45) Date of Patent: Apr. 19, 2005

(54) HIGH RESOLUTION IMAGE FORMATION FROM A MULTIPLE APERTURE IMAGING SYSTEM

(75) Inventors: Robert D. Fiete, Fairport, NY (US); Theodore A. Tantalo, Rochester, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 135 days.

(21) Appl. No.: 10/454,266

(22) Filed: Jun. 4, 2003

(65) Prior Publication Data

US 2004/0246604 A1 Dec. 9, 2004

(51) Int. Cl.⁷ ................................................. G02B 5/08
(52) U.S. Cl. ........................ 359/850; 359/851; 359/419
(58) Field of Search .............................. 359/850–851, 359/237, 399, 419; 250/201.9, 333–334; 356/121

(56) References Cited

U.S. PATENT DOCUMENTS

| | | | | |
|---|---|---|---|---|
| 3,507,547 A | * | 4/1970 | Thomas ....................... | 359/364 |
| 4,330,775 A | * | 5/1982 | Iwamoto et al. ............ | 382/141 |
| 4,824,243 A | * | 4/1989 | Wheeler et al. ............ | 356/121 |
| 4,950,880 A | | 8/1990 | Hayner | |
| 5,083,015 A | * | 1/1992 | Witthoft et al. .......... | 250/201.9 |
| 5,093,563 A | | 3/1992 | Small et al. | |
| 5,159,489 A | * | 10/1992 | Massie et al. .............. | 359/419 |
| 5,229,889 A | * | 7/1993 | Kittell ........................ | 359/849 |
| 5,283,672 A | | 2/1994 | Hong et al. | |
| 5,384,455 A | * | 1/1995 | Paxman .................... | 250/201.9 |
| 5,610,707 A | | 3/1997 | Duncan et al. | |
| 5,905,591 A | | 5/1999 | Duncan et al. | |
| 5,919,128 A | | 7/1999 | Fitch | |
| 6,369,932 B1 | | 4/2002 | Gerchberg | |
| 6,376,819 B1 | | 4/2002 | Neal et al. | |

OTHER PUBLICATIONS

Joseph W. Goodman, "Introduction to Fourier Optics" Second Edition, 1996, McGraw–Hill Companies, Inc.

* cited by examiner

*Primary Examiner*—Mohammad Sikder
(74) *Attorney, Agent, or Firm*—RatnerPrestia

(57) ABSTRACT

In a method for imaging using multiple apertures, the present invention uses a wavefront sensor, a phase sensor, and an image processor to construct a high-resolution image without using complex relay optics. A wavefront sensor collects information that allows the wavefront from each aperture to be reconstructed and a phase sensor collects information regarding the relative phase difference between the apertures. An image processor uses the information collected from the phase sensor to correct the phase differences between the apertures, reconstruct the wavefronts from the wavefront sensor data, then coherently sums the wavefronts from each aperture to form a high-resolution image that corresponds to a synthesized aperture that is larger than any of the individual apertures.

18 Claims, 5 Drawing Sheets

HIGH RESOLUTION IMAGE FORMATION FROM A MULTIPLE APERTURE IMAGING SYSTEM

FIELD OF THE INVENTION

The invention relates generally to the field of imaging systems, and in particular to multiple aperture imaging systems. More specifically, the invention relates to a method of combining the image information from each aperture to form an image with a higher resolution than possible with an image captured from a single aperture.

BACKGROUND OF THE INVENTION

Ray theory of light predicts that the pattern of a plane wave should maintain the size and shape of the aperture, but diffraction causes light passing through an aperture to deviate from its original direction of propagation. The further the plane wave propagates past the aperture, the more the diffraction pattern changes. The mathematical modeling of diffraction is necessary to understand the image formation properties of an imaging system.

An electromagnetic wave that has traveled to an x-y plane from a parallel $\xi$-$\eta$ plane a distance z away can be described by the Huygens-Fresnel Principle (see *Introduction to Fourier Optics* by Joseph W. Goodman, McGraw-Hill, second edition, 1996) as $$U(x,y) = \frac{z}{i\lambda} \int\int_\infty U_0(\xi,\eta) \frac{e^{i\frac{2\pi}{\lambda}r}}{r} d\xi d\eta \qquad \text{(Equation 1)}$$

where $U(x,y)$ is the electric field amplitude in the x-y plane, $U_0(\xi,\eta)$ is the electric field amplitude in the $\xi$-$\eta$ plane, $\lambda$ is the wavelength of the electromagnetic wave, and $$r = \sqrt{(x-\xi)^2 + (y-\eta)^2 + z^2}.$$

Therefore, the Huygens-Fresnel Principle multiplies $U_0(\xi,\eta)$ by a spherical wave before the integration.

Fresnel diffraction occurs when the spherical wave can be approximated with a parabolic wave, which is a valid approximation if $$z >> \left(\frac{\pi}{4\lambda}[(x-\xi)^2 + (y-\eta)^2]\right)^{\frac{2}{3}} \qquad \text{(Equation 2)}$$

The field amplitude of $U(x,y)$ after propagating a distance z can now be written as $$U(x,y) = \qquad \text{(Equation 3)}$$

$$\frac{e^{i\frac{2\pi z}{\lambda}}}{i\lambda z} e^{i\frac{\pi}{\lambda z}(x^2+y^2)} \int\int_\infty [U_0(\xi,\eta) e^{i\frac{\pi}{\lambda z}(\xi^2+\eta^2)}] e^{-i\frac{2\pi}{\lambda z}(x\xi+y\eta)} d\xi d\eta$$

Basically, it is the Fourier transform of the field amplitude that is first multiplied by a quadratic phase (chirp). The expression for Fresnel diffraction can be rearranged to give $$U(x,y) = \frac{e^{i\frac{2\pi z}{\lambda}}}{i\lambda z} \int\int_\infty U_0(\xi,\eta) e^{i\frac{\pi}{\lambda z}[(x-\xi)^2 + (y-\eta)^2]} d\xi d\eta \qquad \text{(Equation 4)}$$

which is simply the convolution of the field amplitude with a chirp. Fraunhofer diffraction occurs when the spherical wave can be approximated with a plane wave, which is a valid approximation if $$z >> \frac{2\pi(x^2+y^2)}{2\lambda} \qquad \text{(Equation 5)}$$

The field amplitude of $U(x,y)$ after propagating a distance z can now be written as $$U(x,y) = \frac{e^{i\frac{2\pi z}{\lambda}}}{i\lambda z} e^{i\frac{\pi}{\lambda z}(x^2+y^2)} \int\int_\infty U_0(\xi,\eta) e^{-i\frac{2\pi}{\lambda z}(x\xi+y\eta)} d\xi d\eta \qquad \text{(Equation 6)}$$

Basically this is simply the Fourier transform of the field amplitude, i.e.

$$U(x,y) = \frac{e^{i\frac{2\pi z}{\lambda}}}{i\lambda z} e^{i\frac{\pi}{\lambda z}(x^2+y^2)} FT\{U_0(\xi,\eta)\}\bigg|_{\xi=\frac{x}{\lambda z},\eta=\frac{y}{\lambda z}} \qquad \text{(Equation 7)}$$

If the optical aperture is lens of focal length f with a pupil function $P(x,y)$, where $$P(x,y) = \begin{cases} 1 & \text{if}(x,y) \text{ is within the aperture} \\ 0 & \text{if}(x,y) \text{ is outside the aperture} \end{cases} \qquad \text{(Equation 8)}$$

then the amplitude distribution $U_0(x,y)$ behind the lens becomes $$U_0(x,y) = U_i(x,y) P(x,y) e^{-i\frac{\pi}{\lambda f}(x^2+y^2)} \qquad \text{(Equation 9)}$$

where $U_i(x,y)$ is the amplitude distribution in front of the lens. If $U_i(x,y)$ is a plane wave and $P(x,y)$ is a circular aperture, then for a properly focused diffraction-limited incoherent imaging system with a clear circular aperture, the optics PSF (point spread function) at the focal plane is given by substituting Equation 9 into Equation 7, resulting in the Airy function $$PSF_{circular\ aperture}(r) = \qquad \text{(Equation 10)}$$

$$|U_{circular\ aperture}(x,y)|^2 = \left(\frac{\pi D^2}{4\lambda f}\right)^2 \left[\frac{2J_1\left(\frac{\pi D r}{\lambda f}\right)}{\frac{\pi D r}{\lambda f}}\right]^2$$

where $$r = \sqrt{x^2+y^2},$$

D is the diameter of the circular aperture, f is the focal length, $\lambda$ is the wavelength of light, and $J_1(\cdot)$ is the first-order Bessel function. The width of the PSF is generally defined by the diameter within the first zero, which is given by $$PSF_{circular\ aperture} width = 2.44 \frac{\lambda f}{D} = 2.44 \lambda (f\#) \quad \text{(Equation 11)}$$

where f#=f/D. The Rayleigh criterion for resolution is defined as the separation between two point sources such that the peak of one source is on the first zero of the second, which occurs at 1.22 λ(f#). The OTF (optical transfer function) of a diffraction-limited incoherent imaging system is the Fourier transform of the optics PSF, and the magnitude of the OTF is the MTF (modulation transfer function) of the optics. The optics MTF for an incoherent diffraction-limited optical system is essentially the aperture MTF, which is calculated by autocorrelating the aperture function. For a clear circular aperture of diameter D, the incoherent aperture MTF is given by $$MTF_{incoherent}(\rho) = \quad \text{(Equation 12)}$$
$$\frac{2}{\pi}\left[\cos^{-1}(\rho_n) - \rho_n \sqrt{1-\rho_n^2}\right] \text{ for } 0 \le \rho_n \le 1$$

$$MTF_{incoherent}(\rho) = \text{ for } \rho_n > 1 \quad \text{(Equation 13)}$$

where $$\rho_n = \frac{\rho}{\rho_c} \quad \text{(Equation 14)}$$

$$\rho_{c(incoherent)} = \frac{1}{\lambda (f\#)} = \frac{D}{\lambda f} \quad \text{(Equation 15)}$$

and ρ is the radial spatial frequency. For coherent imaging systems with circular apertures, the MTF is simply the aperture function $$MTF_{coherent}(\rho) = 1 \text{ for } 0 \le \rho_n \le 1 \quad \text{(Equation 16)}$$

$$\ldots MTF_{coherent}(\rho) = 0 \text{ for } \rho_n > 1 \quad \text{(Equation 17)}$$

where $$\rho_{c(coherent)} = \frac{1}{2\lambda (f\#)} = \frac{D}{2\lambda f} \quad \text{(Equation 18)}$$

Note that for both coherent and incoherent imaging systems there is a distinct spatial frequency cutoff, $\rho_c$, which is proportional to the aperture size and defines the highest spatial resolution that can be imaged with the optical system. An imaging system with a larger aperture size, therefore, will capture images at higher resolution than an imaging system with a smaller aperture size.

Sparse apertures (also called dilute apertures) use a reduced aperture area to synthesize the optical performance of a filled aperture. A sparse aperture system can combine the light captured by smaller apertures to capture a higher spatial resolution than possible from any of the individual apertures. This concept is very appealing in technology areas where a filled aperture is too large or heavy for the intended application. Sparse aperture concepts have been used to design large astronomical telescopes as well as small endoscopic probes (see U.S. Pat. No. 5,919,128 titled "SPARSE APERTURE ENDOSCOPE," issued Jul. 6, 1999 to Fitch).

FIG. 1a illustrates a traditional Cassegrain telescope 10. FIG. 1b illustrates a prior art sparse aperture telescope 12 created by removing parts of the primary mirror of the Cassegrain telescope 10 in FIG. 1a. FIG. 1c illustrates a prior art sparse aperture telescope 14 created by using multiple afocal telescopes 16 that relay light into a combiner telescope 18 using an optical relay system 20 to precisely ensure that the light from each telescope arrives at a detector 21 simultaneously. These optical relay systems require many optical elements to move quickly and precisely to properly combine the light from each of the apertures. The number of these optical elements increases with the number of apertures, thus this alignment may prove too complex for imaging systems with many apertures.

Referring to FIG. 2, consider an image capture system comprising of three apertures 22, each with a diameter d and separated by a distance s. The diffraction-limited resolution of each aperture 22 is proportional to the diameter d, but if the electromagnetic wavefront from each aperture 22 is coherently combined, then a higher resolution can be captured as if collected by a single aperture 24 of diameter d+s. This requires the electromagnetic wavefront from each aperture 22 to be properly phased and coherently combined to form a high-resolution image.

To better understand the phasing of the individual wavefronts, first consider a single aperture imaging system shown in FIG. 3. An electromagnetic wavefront 28 from a scene 26 passes through an aperture 30 with lens a distance $z_1$ from the scene 26 and results in the electromagnetic wavefront 32 after the aperture 30, described by Equation 9. The electromagnetic wavefront 32 can be described more generally as a wave function with amplitude a(x,y,z) and phase φ(x,y,z). An image I(x,y) captured by image sensor 34 a distance $z_2$ from the aperture 30 only represents the intensity of the electromagnetic wavefront 28, given by $$I(x, y, z_2) = |a(x, y, z_2)e^{-i\phi(x,y,z_2)}|^2 = a^2(x, y, z_2) \quad \text{(Equation 19)}$$

If the aperture 30 is replaced with N multiple smaller apertures then the wavefront from each aperture must be properly combined to maintain the resolution such that they coherently sum to form an image $$I(x, y, z_2) = \left|\sum_{n=1}^{N} a_n(x, y, z_2)e^{-i\phi_n(x,y,z_2)}\right|^2 \quad \text{(Equation 20)}$$

If each aperture is a lens with focal length f and aperture P(x,y), then the intensity distribution of the image will be $$I(x, y) = \left|\sum_{n=1}^{N} U_n(x, y)P(x, y)e^{-i\frac{\pi}{\lambda f}(x^2+y^2)}\right|^2 \quad \text{(Equation 21)}$$

where $U_n(x,y)$ is the amplitude distribution in front of the $n^{th}$ lens. Note that simply imaging the wavefronts from each aperture will not generate a high-resolution image because the electromagnetic wavefronts are not properly added; only the intensity values are added.

FIG. 4 illustrates a multiple aperture system, similar to the sparse aperture telescope 14 that combines the individual wavefronts as disclosed in U.S. Pat. No. 5,905,591 titled "MULTI-APERTURE IMAGING SYSTEM," issued May 18, 1999 to Duncan et al. An electromagnetic wavefront 28 from a scene 26 passes through the multiple apertures 22 to produce wavefronts 36 that pass through an optical relay system 20, which coherently sums the wavefronts 36 from each aperture 22 with a set of movable mirrors 38. The resulting wavefront 40 from the optical relay system 20 is imaged by the combiner 42, which produces the proper wavefront 44 to be imaged by the imaging sensor 34. If the wavefronts are not properly summed then the resolution corresponding to the synthesized aperture will not be achieved.

Some designers of synthetic aperture arrays have developed probes (see U.S. Pat. No. 4,950,880 titled "SYNTHETIC APERTURE OPTICAL IMAGING SYSTEM," issued Aug. 21, 1990 to Hayner and U.S. Pat. No. 5,093,563 titled "ELECTRONICALLY PHASED DETECTOR ARRAYS FOR OPTICAL IMAGING," issued Mar. 3, 1992 to Small et al.) where each aperture produces an electrical signals representing the amplitude and phase of the incoming light and have the advantage that large-aperture resolutions are synthesized without optical phase compensating components. However, because each aperture in these approaches outputs a single electrical signal, requiring the need to acquire many images to build up the samples in Fourier space in order to form a two-dimensional image. An example of this approach is the Very Large Array (VLA) radio telescope, which uses a horn antenna at the prime focus to collect amplitude and phase information from each aperture and then combines the signals in a correlator to form the high-resolution image.

A holographic technique for generating high-resolution telescope images has been developed (see U.S. Pat. No. 5,283,672 titled "HOLOGRAPHIC TECHNIQUES FOR GENERATING HIGH RESOLUTION TELESCOPIC IMAGES," issued Feb. 1, 1994 to Hong et al.) where a small lens is shifted laterally and a sequence of exposures is recorded on holographic medium. The plurality of holograms is illuminated with a coherent reference beam to reconstruct a high-resolution image that corresponds to a lens as large as the distance that the small lens was shifted. The advantage of this technique is that an image with the resolution corresponding to a large lens can be generated using a small lens. However, this technique requires a sequence of holograms and a coherent illumination source to illuminate the scene and reconstruct the image. Also, this technique does not use an image processor but relies on optical methods to generate the final image.

There is a need, therefore, for an image capture method that utilizes an image processor to coherently combine the electromagnetic wavefront from each aperture without the need for complex optical relay systems, a multitude of collections to build up the spatial frequencies of the scene, or a sequence of holograms.

SUMMARY OF THE INVENTION

The present invention is directed to overcoming one or more of the problems set forth above. Briefly summarized, according to one aspect of the present invention, the invention resides in a method for reconstructing a high-resolution image using information captured from multiple apertures to characterize the electromagnetic wavefront at each aperture. More specifically, one aspect of the invention includes the steps of: a) acquiring information that characterizes the electromagnetic wavefront from each aperture; b) acquiring information regarding the relative phasing of each aperture; c) using the acquired information to calculate the combined electromagnetic wavefront from all apertures; and d) reconstructing a high-resolution image from the combined wavefront using an image processor.

ADVANTAGEOUS EFFECT OF THE INVENTION

This invention produces a high-resolution image by characterizing the electromagnetic wavefront from individual apertures and uses an image processor to form an image with higher resolution than possible from each individual aperture without the need for using mechanical methods to combine the individual wavefronts from each aperture.

DETAILED DESCRIPTION OF THE INVENTION

Because image processing systems are well known, the present description will be directed in particular to attributes forming part of, or cooperating more directly with, the method in accordance with the present invention. Attributes not specifically shown or described herein may be selected from those known in the art.

If the invention is implemented as a computer program, the program may be stored in conventional computer readable storage medium, which may comprise, for example; magnetic storage media such as a magnetic disk (such as a floppy disk or a hard drive) or magnetic tape; optical storage media such as an optical disc, optical tape, or machine readable bar code; solid state electronic storage devices such as random access memory (RAM) or read only memory (ROM); or any other physical device or medium employed to store a computer program.

Figure 1A:
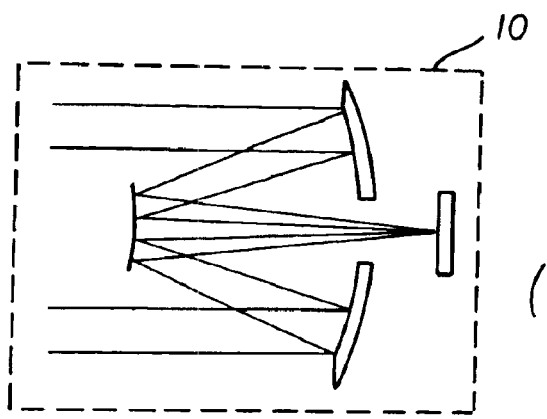
FIG. 1a illustrates a prior art Cassegrain telescope.
Figure 1B:
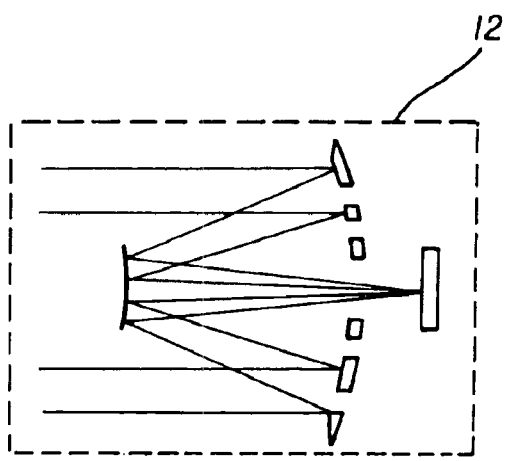
FIG. 1b illustrates a prior art sparse aperture telescope utilizing a modified primary mirror of the Cassegrain telescope shown in FIG. 1a to simulate a conventional telescope.
Figure 1C:
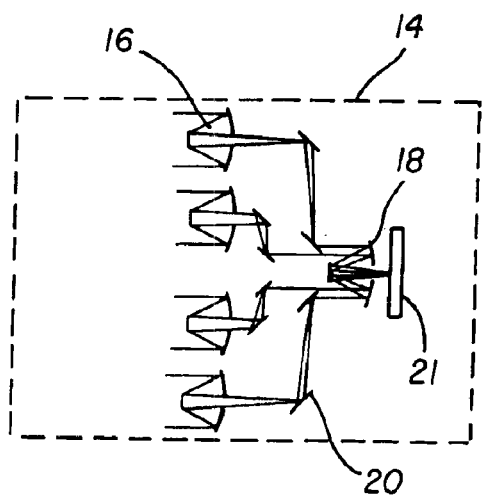
FIG. 1c illustrates a prior art sparse aperture telescope utilizing multiple afocal telescopes and a combiner telescope with an optical relay system to simulate a conventional telescope.
Figure 2:
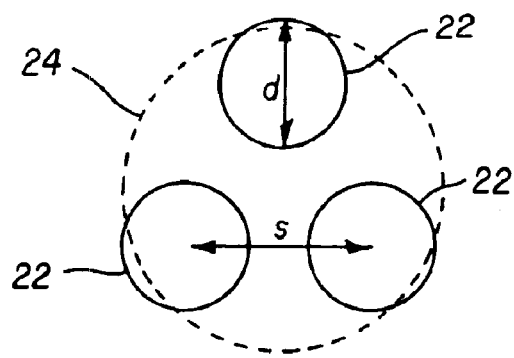
FIG. 2 illustrates a prior art three-aperture system that synthesizes a larger aperture.
Figure 3:
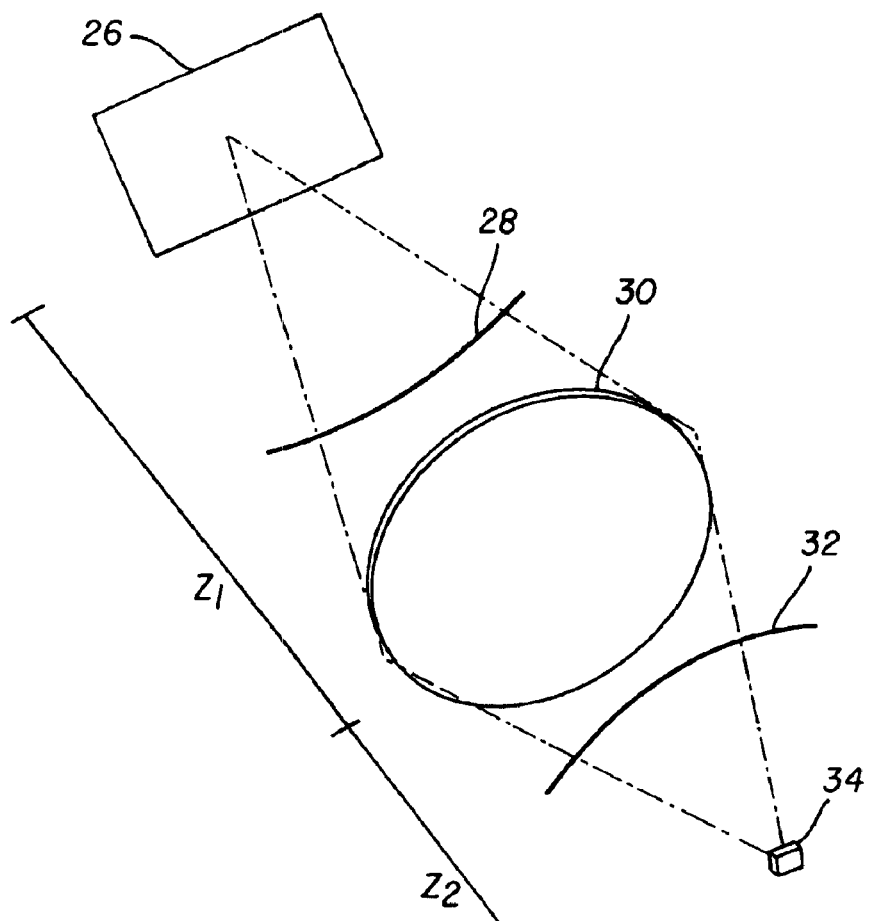
FIG. 3 is a schematic diagram of a prior art imaging system that illustrates the propagation of the electromagnetic wave in a single aperture optical system.
Figure 4:
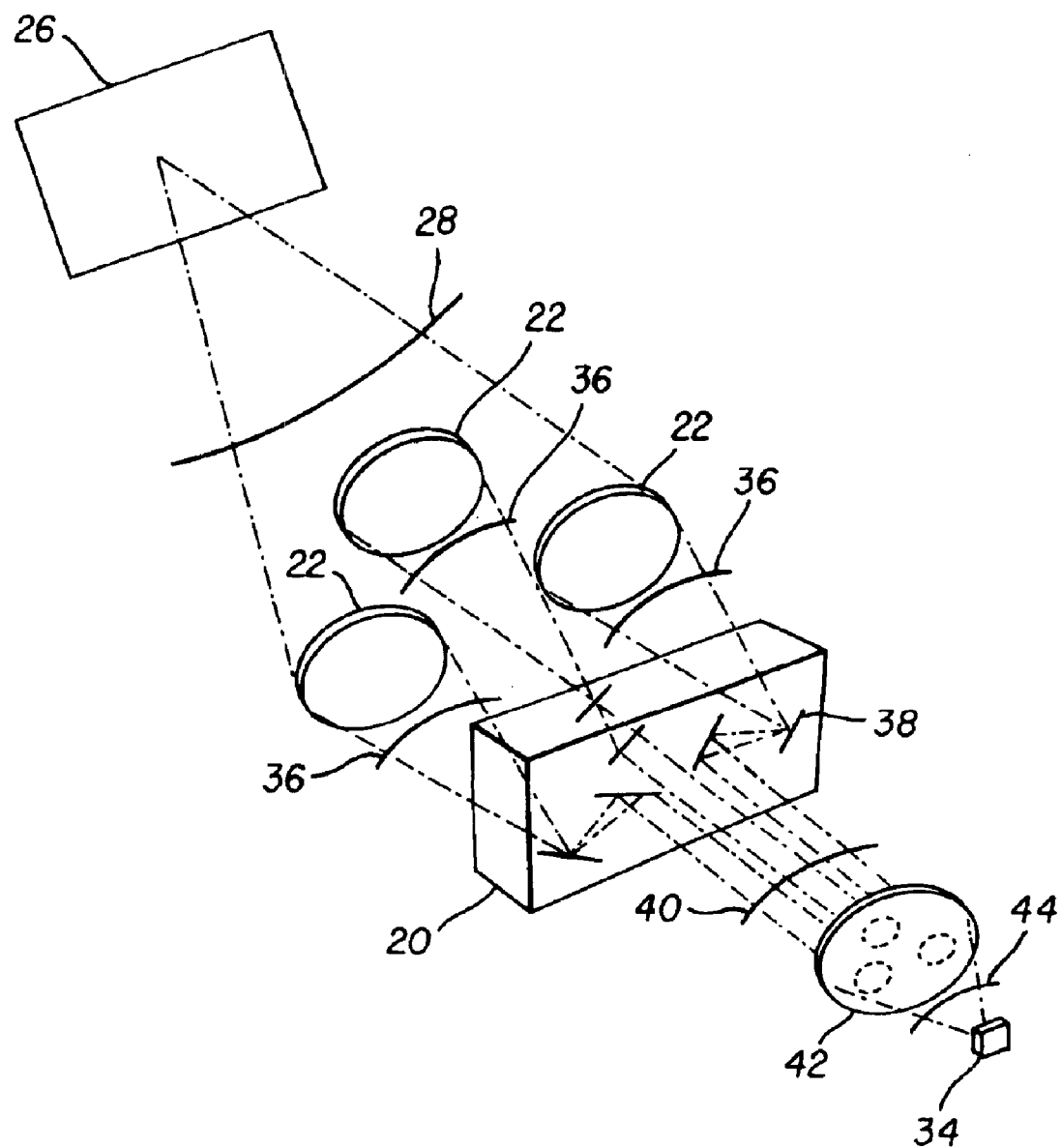
FIG. 4 is a schematic diagram of a prior art imaging system that illustrates the propagation of the electromagnetic wave in a multiple aperture optical system.
Figure 5:
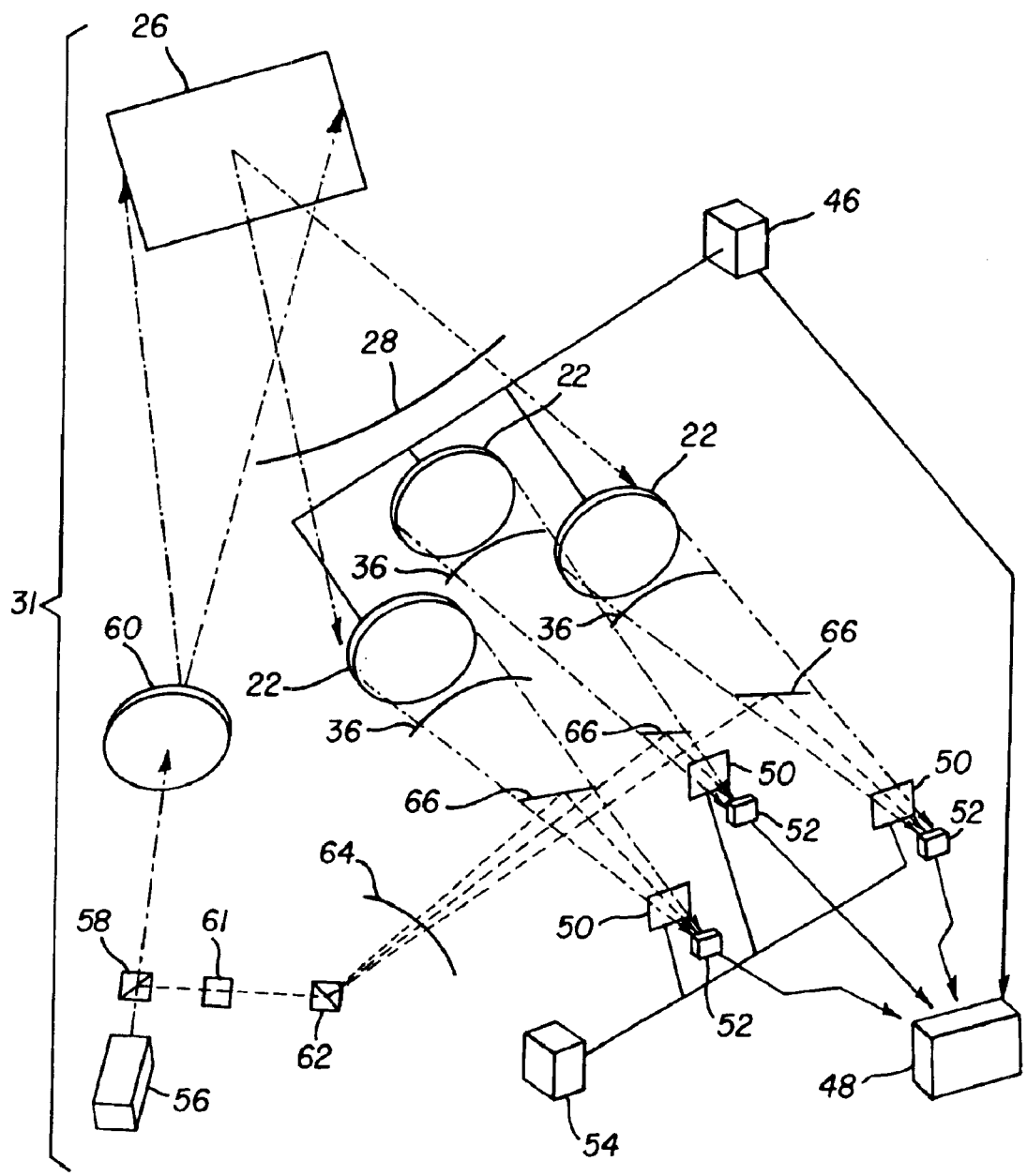
FIG. 5 is a schematic diagram of a multiple aperture imaging system according to the present invention.

The present invention disclosed here does not require the optical relay system 20. The invention records information after each aperture that allows the electromagnetic wavefronts to be reconstructed and combined such that a high-resolution image can be obtained. In one embodiment, multiple aperture imaging system 31, shown in FIG. 5, comprises an electromagnetic wavefront 28 from the scene 26 passes through the multiple apertures 22 to produce wavefronts 36. Misalignment of the apertures 22 relative to one another can reduce the image quality; hence the misalignments between the apertures 22 are measured using an aperture alignment sensor 46 to account for wavefront errors that might be induced by the optical system such as piston, tip/tilt, magnification differences, field dependent terms, and path length errors. Techniques for measuring the relative alignment between apertures are well established in the art (see U.S. Pat. No. 5,610,707, titled "WAVEFRONT SENSING FOR STARING IMAGER," issued Mar. 11, 1997 to Duncan et al.). The misalignment between the apertures 22 can be corrected by actively adjusting the apertures 22 to align them within a user defined specification or the measure of the relative alignment between the apertures can be used in the image processor 48 to correct the phase differences between the wavefronts 36.

Each aperture has a shutter 50 and a wavefront sensor 52. A high-speed pulse generator 54 opens and closes the shutters 50 to ensure that the wavefront information imaged by the wavefront sensors 52 are within the coherence length of the light forming the wavefronts 36. The wavefront sensors 52 can be any method that records information from which the amplitude and phase information of the wavefronts 36 can be reconstructed. A standard technique is interferometry, which adds a known mutually coherent source 56 to unknown wavefronts in the scene 26. This can be accomplished by illuminating the scene 26 with a coherent source 56. The light from the coherent source 56 passes through a beamsplitter 58 that directs part of the light to a transmitter element 60 used to illuminate the scene. The rest of the light from the beamsplitter 58 is directed through a coherence modifier 61, which reduces the coherence length of the coherent source 56 to reduce the degrading effects of coherent light such as speckle. In one embodiment, the coherence modifier 61 is rotating ground glass. After passing through the coherence modifier 61, the light is directed to a dispersion element 62 that divides the light into reference wavefronts 64 that are redirected by optical elements 66 to interfere with each of the incoming wavefronts 36. The sum of the combined wavefronts contains the amplitude and phase of any unknown wavefronts and can be recorded as an interferogram on the wavefront sensors 52. The amplitude and phase of the desired wavefront are reconstructed from the interferogram in the image processor 48. Other methods exist that may be used to determine the wavefront from each aperture 22, such as a system for recovering phase information from recorded intensity values (see U.S. Pat. No. 6,369,932, titled "SYSTEM AND METHOD FOR RECOVERING PHASE INFORMATION OF A WAVEFRONT," issued Apr. 9, 2002 to Gerchberg) or a Shack-Hartman sensor probe (see U.S. Pat. No. 6,376,819, titled "SUB-LENS SPATIAL RESOLUTION SHACK-HARTMAN WAVEFRONT SENSING," issued Apr. 23, 2002 to Neal et al.).

Figure 6:
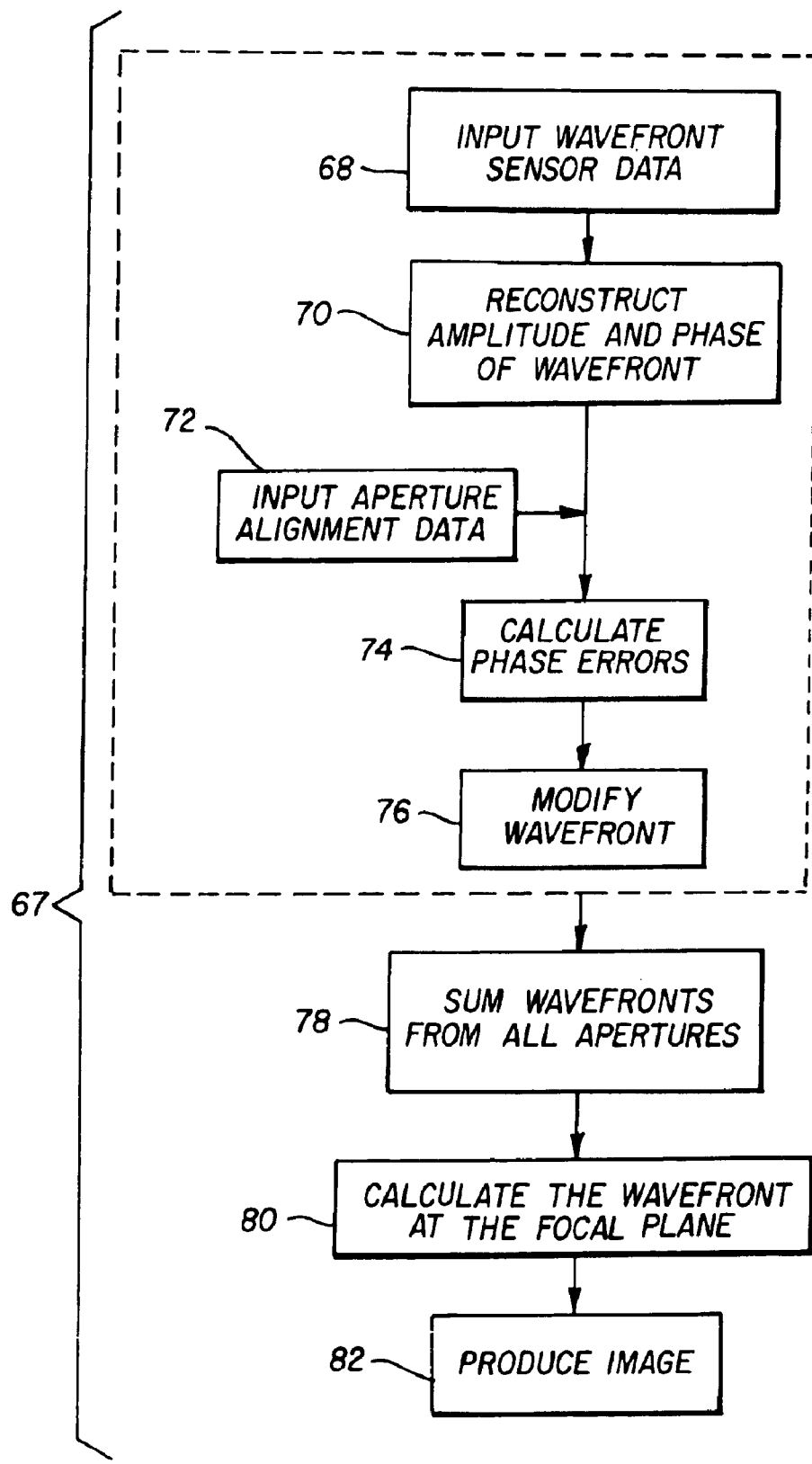
FIG. 6 illustrates the flow of the image processor according to the present invention.

The image processor 48 processes the data recorded by the wavefront sensor 52 and the aperture alignment sensor 46 to coherently combine the electromagnetic wavefront from each aperture 22, allowing a high-resolution image to be formed. The flow diagram 67 for the image processor 48 is shown in FIG. 6. Steps 68–76 are performed for each aperture. The data from the wavefront sensor 52 is input 68 into the image processor 48 and used to reconstruct 70 the amplitude and the phase of the wavefront 36. In one embodiment, the wavefront sensor data 68 is an interferogram and the wavefront reconstruction step 70 calculates the amplitude $a(x,y,z)$ and phase $\phi(x,y,z)$ of the wavefront 36 from the interferogram. The data from the alignment sensor 46 is input 72 to calculate the phase errors 74. The reconstructed wavefront from each aperture is modified 76 to reduce the errors. The corrected wavefronts are summed 78 to synthesize a single wavefront from all of the apertures, which is then used to calculate the wavefront at the focal plane 80. The intensity of this combined wavefront is then calculated to generate the high-resolution image 82.

The invention has been described with reference to one embodiment. However, it will be appreciated that variations and modifications can be effected by a person of ordinary skill in the art without departing from the scope of the invention.

Parts List

10 Cassegrain telescope
12 sparse aperture telescope created by removing parts of the primary mirror of a Cassegrain telescope
14 sparse aperture telescope created by using multiple afocal telescopes
16 afocal telescope
18 combiner telescope
20 optical relay system
21 detector
22 individual aperture of a multiple aperture system
24 synthesized aperture
26 scene being imaged
28 electromagnetic wavefront from object
30 single aperture
31 multiple aperture imaging system
32 electromagnetic wavefront after passing through single aperture
34 imaging sensor
36 electromagnetic wavefront after passing through single aperture of a multiple aperture system
38 movable mirrors
40 electromagnetic wavefront after passing through the optical relay system
42 combiner
44 electromagnetic wavefront after passing through the combiner
46 aperture alignment sensor
48 image processor
50 shutter
52 wavefront sensor
54 high-speed pulse generator
56 coherent source
58 beamsplitter
60 transmitter element Parts List—Continued 61 conherence modifier
62 dispersion element
64 reference wavefronts
66 optical elements to redirect wavefronts
67 flow diagram
68 input wavefront sensor data step in image processor
70 reconstruct amplitude and phase wavefront step in image processor
72 input aperture alignment sensor data step in image processor
74 calculate phase errors step in image processor
76 modify wavefront step in image processor
78 sum wavefronts from all apertures step in image processor
80 calculate the wavefront at the focal plane step
82 produce image step in image processor

What is claimed is:

1. A method of increasing image resolution by employing a multiple aperture image capture system, comprising the steps of:

a) sensing electromagnetic wavefront information from each aperture in the multiple aperture image capture system, wherein a plurality of apertures are imaged within a coherence time corresponding to an illumination source;

b) calculating amplitude and phase components of wavefronts propagating from each aperture with an image processor;

c) mathematically combining the amplitude and phase components of the wavefronts propagating from each aperture; and d) forming an image from the calculated amplitude and phase components of each wavefront to form an image of higher resolution greater than any image captured by an individual aperture in the multiple aperture image capture system.

2. The method claimed in claim 1, further comprising the step of selectively passing the wavefronts from each aperture within the coherence time corresponding to the illumination source.

3. The method claimed in claim 1, wherein the illumination source is a coherent illumination source.

4. The method claimed in claim 3, wherein the coherent source is a laser.

5. The method claimed in claim 2, wherein the illumination source is a coherent illumination source having a corresponding coherence length.

6. The method claimed in claim 5, wherein the coherence length of the coherent illumination source is modified.

7. The method claimed in claim 6, wherein the coherent illumination source is a laser.

8. The method claimed in claim 2, wherein the illumination source is an incoherent source.

9. The method claimed in claim 1 wherein any aperture misalignments are measured and used to modify the wavefronts.

10. A multiple aperture imaging system, comprising:
  a) a plurality of apertures for capturing and propagating wavefronts of light within a coherence time corresponding to an illumination source;
  b) at least one shutter for selectively passing the wavefronts of light from each of the plurality of apertures within the coherence time corresponding to the illumination source;
  c) a wavefront sensor for sensing input electromagnetic wavefront information from each of the plurality of apertures, wherein the electromagnetic wavefront information includes amplitude and phase components for each wavefront of light; and
  d) an image processor for forming an image from reconstructed amplitude and phase components of each wavefront of light to form an image of higher resolution greater than any image captured by an individual aperture in the multiple aperture imaging system.

11. The multiple aperture imaging system according to claim 10, wherein the multiple aperture imaging system uses a coherent illumination source.

12. The multiple aperture imaging system according to claim 11, wherein the multiple aperture imaging system uses a clock to operate the at least one shutter.

13. The multiple aperture imaging system according to claim 10, wherein the multiple aperture imaging system uses steering mirrors.

14. The multiple aperture imaging system according to claim 10, wherein the illumination source is incoherent.

15. A multiple aperture imaging system, comprising:
  a) a plurality of apertures for capturing and propagating wavefronts of light within a coherence time corresponding to an illumination source;
  b) a wavefront sensor for sensing input electromagnetic wavefront information from each aperture, wherein the electromagnetic wavefront information includes amplitude and phase components for each wavefront of light; and
  c) an image processor for forming an image from reconstructed amplitude and phase components of each wavefront of light to form an image of higher resolution greater than any image captured by an individual aperture in the multiple aperture imaging system.

16. A method of increasing image resolution by employing a multiple aperture image capture system, comprising the steps of:
  a) sensing electromagnetic wavefront information from each aperture in the multiple aperture image capture system, wherein a plurality of apertures are imaged within a coherence time corresponding to a coherent illumination source;
  b) calculating amplitude and phase components of wavefronts propagating from each aperture with an image processor;
  c) mathematically combining the amplitude and phase components of the wavefronts propagating from each aperture; and
  d) forming an image from the calculated amplitude and phase components of each wavefront to form an image of higher resolution greater than any image captured by an individual aperture in the multiple aperture image capture system.

17. The method claimed in claim 16, wherein the coherent illumination source is shuttered for selectively passing the wavefronts from each of the plurality of apertures within the coherence time corresponding to the coherent illumination source.

18. A method of increasing image resolution by employing a multiple aperture image capture system, comprising the steps of:
  a) sensing electromagnetic wavefront information from each aperture in the multiple aperture image capture system, wherein a plurality of apertures are imaged within a coherence time corresponding to an incoherent illumination source, the incoherent illumination source is shuttered for selectively passing wavefronts from each of the plurality of apertures within the coherence time corresponding to the incoherent illumination source;
  b) calculating amplitude and phase components of the wavefronts propagating from each aperture with an image processor;
  c) mathematically combining the amplitude and phase components of the wavefronts propagating from each aperture; and
  d) forming an image from the calculated amplitude and phase components for each of the wavefronts to form an image of higher resolution greater than any image captured by an individual aperture in the multiple aperture image capture system.

* * * * *